United States Patent
Saul

[15] 3,684,259
[45] Aug. 15, 1972

[54] HEAT TREATMENT OF BODIES OF COMBUSTIBLE MATERIAL

[72] Inventor: Geoffry Hugh Saul, Harrogate, England

[73] Assignee: Cawood Wharton & Company Limited, Harrogate, England

[22] Filed: Sept. 18, 1970

[21] Appl. No.: 73,363

[30] Foreign Application Priority Data

Feb. 10, 1970  Great Britain..........15,070/69

[52] U.S. Cl....................................263/8 R, 165/104
[51] Int. Cl................................................F27b 9/24
[58] Field of Search.....263/8 R, 19 B, 40 A; 165/104

[56] References Cited

UNITED STATES PATENTS 3,477,703  11/1969  Tamalet.................165/104 X
2,872,386  2/1959   Aspegren.................263/19 B Primary Examiner—John J. Camby
Attorney—Larson, Taylor and Hinds

[57] ABSTRACT

A method of and apparatus for heat treating bodies of combustible material in which a bed of the bodies is continuously moved by means of a conveyor in such manner that the individual bodies do not move relatively to one another and to the conveyor, heated granular material being passed through the conveyed bed so as to transfer heat to the individual bodies and air flow through the bed of bodies being controlled during said heat treatment.

8 Claims, 3 Drawing Figures

HEAT TREATMENT OF BODIES OF COMBUSTIBLE MATERIAL

BACKGROUND OF THE INVENTION

Field of the invention

This invention relates to a method of and apparatus for heat treating bodies of combustible material.

The term "bodies of combustible material" as used herein denotes pieces of coal and formed artefacts of carbonaceous substances such as coke and coal briquettes and ovoids. Binders are used to agglomerate such artefacts, which binders may be coal tar pitch, bitumen, sulphite lye, synthetic resins, or an suitable adhesive material.

Since the introduction of the Clean Air Act 1956 in the United Kingdom, in order for any combustible material to be approved as a fuel for domestic use in a clean air zone it must not emit more than 5 gms of smoke an hour, when tested according to B.S. 3841, 1965. The term "smoke" as used herein may be defined as suspended particles or droplets of carbonaceous matter, grit and dust, arising from the combustion of fuel. When fuels for domestic use, such as briquettes and ovoids are made from a nominally smokeless aggregate, for example anthracite, the binder used may result in the prescribed maximum of smoke emission being exceeded during combustion. Thus the sale or burning of such fuel in a declared smokeless zone is illegal in the United Kingdom unless it has been treated prior to combustion to bring its smoke emission value within the limit specified by the Clean Air Act.

The main object of the present invention is to provide an improved method of and apparatus for heat treating bodies of combustible material.

SUMMARY OF THE INVENTION

According to one aspect of the present invention a method of heat treating bodies of combustible material comprises continuously moving a bed of the bodies in such manner that the individual bodies do not move relatively to one another, passing heated granular material through the continuously moving bed so as to transfer heat to the individual bodies and controlling air flow through the bed of bodies on the conveyor during said heat treatment.

According to another aspect of the invention there is provided an apparatus for heat treating bodies of combustible material comprising a conveyor on which conveyor a bed of the bodies may be established and which is capable of conveying the bed in such manner that the individual bodies do not move relatively to one another or to the conveyor, means for passing heated granular material through the conveyed bed so as to transfer heat to the individual bodies and means for controlling air flow through the bed of bodies on the conveyor during said heat treatment.

The air flow control means effect control of the rate of oxidation of smoke emission fractions in the bodies and preferably include at least one granular material collection hopper disposed between two stages of the conveyor, and adjustable means for controlling inflow of air to said hopper.

BRIEF DESCRIPTION OF THE DRAWINGS

In order that the invention ma be more fully understood an embodiment in accordance therewith will now described by way of example with reference to the accompanying drawings, in which.

DESCRIPTION OF THE PREFERRED EMBODIMENT

Figure 1:
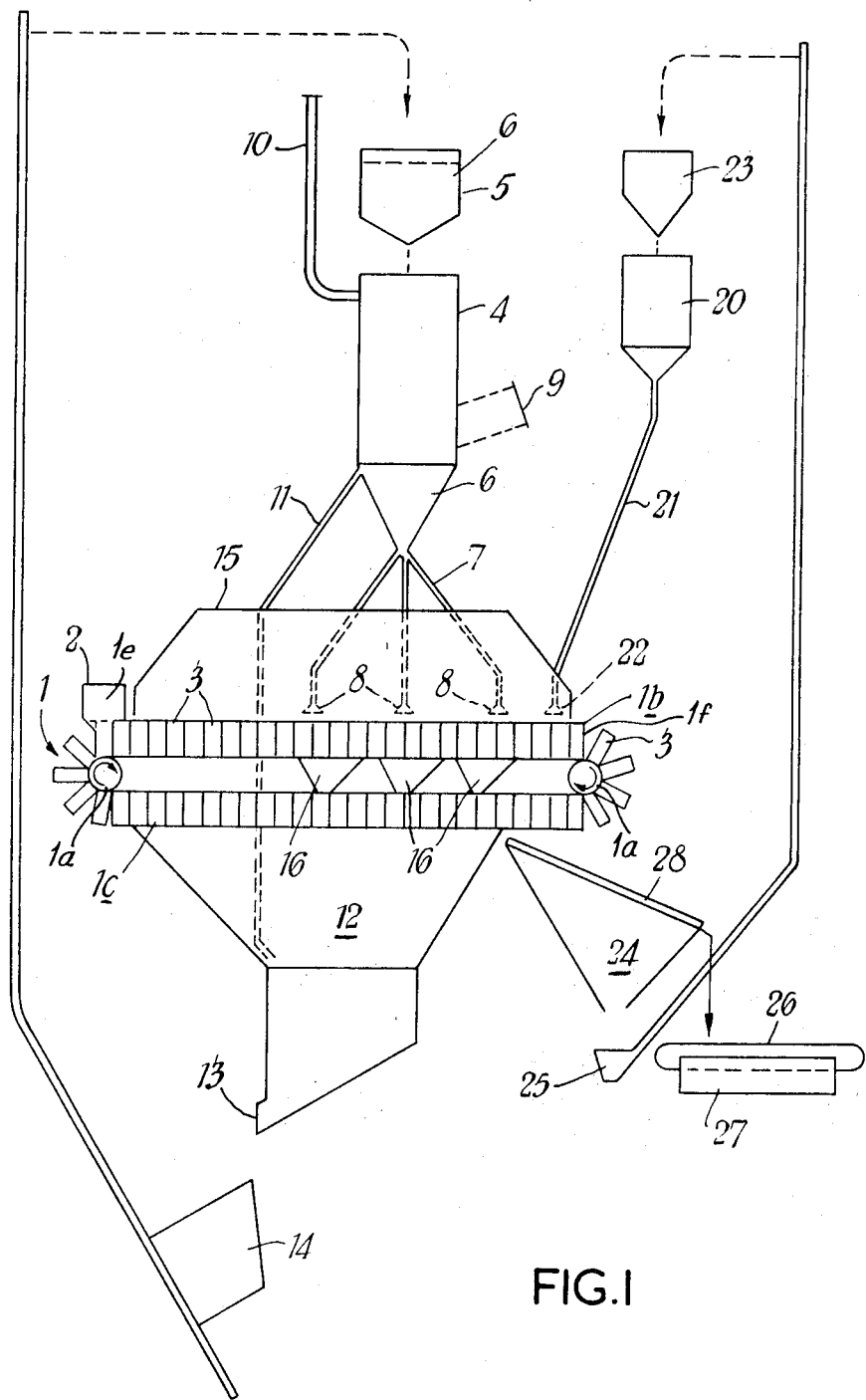
FIG. 1 is a flow diagram of an apparatus for heat treating bodies of combustible material.
Figure 2:
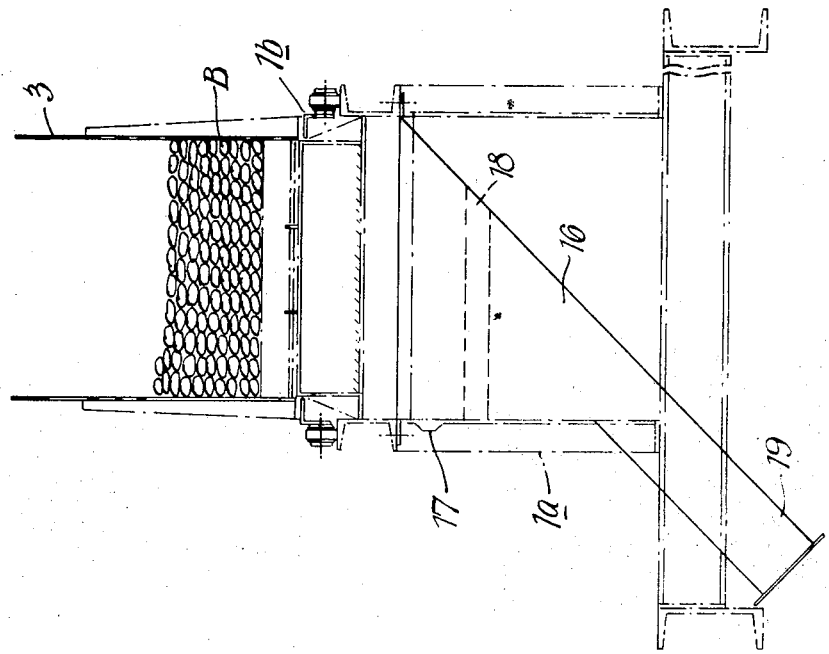
FIG. 2 is a constructional detail in part-cross-section and side elevation through a heat treatment zone of the apparatus of FIG. 1.
Figure 3:
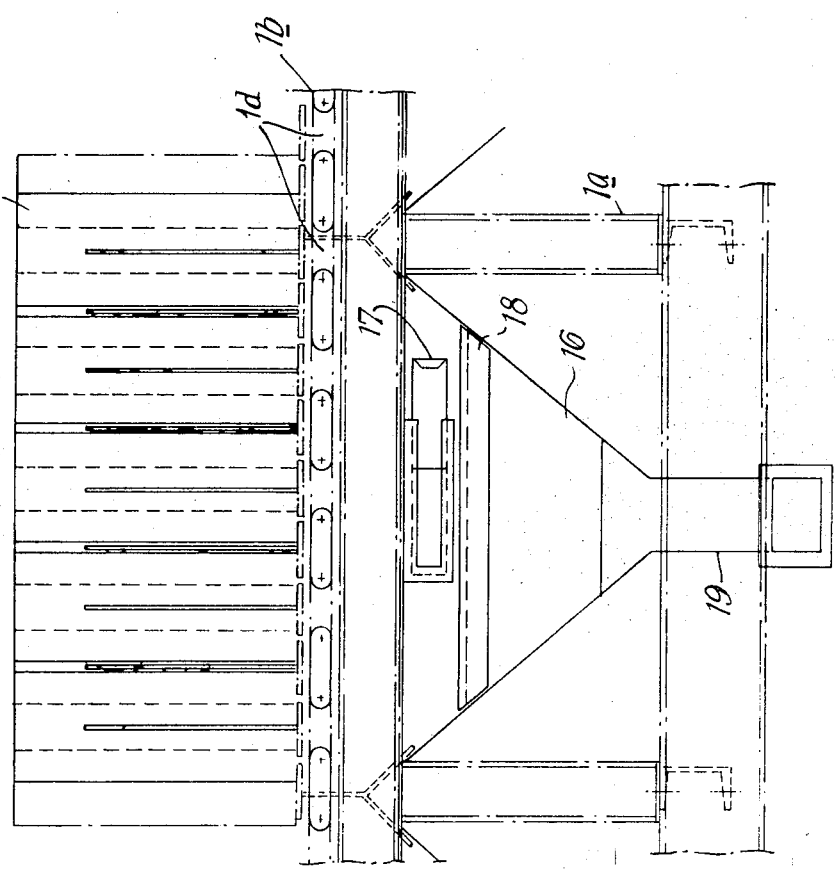
FIG. 3 is a part-sectional end view of the constructional detail of FIG. 2.

Referring to the drawings, the apparatus for heat treating bodies of combustible material incorporates a conveyor 1 supported on a frame 1a (part shown in FIGS. 2 and 3) in the form of a continuous belt having spaced apart upper and lower stages 1b and 1c. A hopper 2 is mounted at the upstream end of the conveyor 1, for continuously establishing a bed of untreated bodies B (FIG. 3) on the conveyor at a charging location 1e. The conveyor 1 is driven continuously by any suitable known form of drive means 1a, for example an electric motor. The movement of the conveyor 1 is continuous along a path extending from the charging location 1e to a location 1f where treated bodies are discharged from the conveyor, the continuous movement of the conveyor being always unidirectional from the charging location 1e to the discharging location 1f, as evidenced by the illustrated arrows. The conveyor and its movement enables continuous movement of the bed of bodies B to take place without movement of the individual bodies relatively to one another or to the conveyor. The conveyor belt is in the form of a grid the openings of the grid being designated 1d in FIG. 2, and has attached overlapping side plates 3 in order to permit the formation of a bed of untreated bodies on the conveyor 1 to the desired thickness.

Disposed above the conveyor 1 is a heater 4 for heating a non-combustible granular material such as sand or grid to a temperature which will result in heat being transferred to the bodies when the granular material passes through a bed of bodies established on the conveyor upper stage 1b by means to be described. The preferred granular material is graded sand and the word "sand" will be used in place of the term "granular material" hereinafter. A hopper 5 is disposed above the heater 4 for supplying sand as indicated at 6 to the heater. The main body of the heater 4 is of rectangular shape with a conical lower portion from which extend sand spray pipes 7 terminating in nozzles 8, for spraying the sand heated in passage through the heater onto the bed of bodies. The nozzles 8 form the means for directing heated sand onto the upper surface of the bed of bodies. The heater 4 has a combustion chamber 9 in which a fuel such as oil is burnt for firing the heater, and a chimney 10 for exhausting the products of combustion to atmosphere. Preferably, the sand heater 4 is, of the cascade type, and made of steel with a lining of refractory material such as fire brick. The heater 4 is provided with a sand overflow pipe 11 for preventing the heater from becoming blocked with sand, the overflow pipe 11 being connected to a sand collection hopper 12 disposed beneath the conveyor 1. Any sand surplus to requirements which is fed into the heater 4 is enabled, by the overflow pipe 11, to be recycled to the hopper 5 in a manner to be described so that continuity of sand supply is ensured.

The hopper 12 has the main function of collecting used sand which has sprayed through the nozzles 8 and has passed through the conveyor upper and lower stages 1b and 1c, by virtue of the grid form of the conveyor, for periodic recycling, reheating and reuse. The hopper 12 has a normally closed discharge opening as indicated at 13. An automatic skip 14 is associated with the hopper 12 into which skip 14 the collected sand is intermittently fed to this hopper for recycling to the hopper 5. To this end the skip 14 and the hopper 12 are provided with any suitable known form of switching-means (not shown) which are set so that, for example, in each cycle of movement of the skip, the switching means are actuated by the skip on passing the discharge opening 13 to open and close the discharge opening 13. It will be appreciated that the sand circulating system is automatically controlled.

Surmounting the conveyor 1 is an extraction hood 15 for removing the gaseous products (fumes), resulting from the heat treatment operation, from that zone in which the heat treatment takes place. The sand spray nozzles 8 are disposed within the extraction hood 15.

Means are provided for controlling air flow through the bed of bodies on the conveyor during heat treatment said means including at least one intermediate used sand collection hopper. In the drawings three such hoppers 16 are disposed between the two stages 1c and 1b of the conveyor 1. One of these hoppers 16 is shown in more detail in FIGS. 2 and 3 to which specific reference will now be made. Each hopper 16 is mounted on the conveyor frame 1a and is provided with adjustable means for controlling inflow of air into the hopper 16 which means is constituted by a slide damper 17 mounted in a wall of the hopper 16. The damper 17 controls the upward flow of air through the conveyor upper stage 1b and the bed of bodies established thereon during a heat treatment operation. In the interior of the hopper 16 a screen tray 18 is mounted which is withdrawable from the hopper to remove any agglomerated particles of sand or other foreign bodies which are trapped by the tray. The hopper 16 is provided with a slopping sand delivery chute 19 which projects sideways and outwards between the two stages of the conveyor 1, the mouth of the chute 19 being disposed above the hopper 12 to permit the used sand to pass into this hopper. Preferably, the hopper 16 is provided with means (not shown) for controlling the discharge of sand.

Disposed above the downstream end of conveyor 1 is an "unheated sand" discharge hopper 20, which is connected through a sand spray pipe 21 to a sand spray nozzle 22 disposed within the extraction hood 15 on the downstream side of the nozzles 8. The unheated sand is fed to the hopper 20 from a supply hopper 23 and is for the purpose of partially quenching the bodies after heat treatment. A slopping vibratable screen 28 is disposed at the downstream end of the conveyor 1 for receiving the treated bodies discharged from the conveyor. The screen 28 is mounted across the mouth of an "unheated sand" collection hopper 24 which together with the screen projects beneath the conveyor lower stage 1c in the manner shown. The sand from the nozzle 22 passes through the screen 28 into the hopper 24.

An automatic skip 25 is operatively associated with the hopper 24 in a similar manner to that in which the skip 14 is associated with the hopper 12 and recycles the sand collected in the hopper 24 to the supply hopper 23. In order to charge this "unheated sand" circulating system with sand for partial quenching purposes initially sand is fed into the hopper 24 through the screen 28. This sand circulating system is also automatic.

A conveyor trough 26 is disposed beneath the discharge end of the screen 28 for conveying the treated bodies through a water bath 27 where the treated bodies are fully quenched and then to a finished product store.

Instead of the unheated sand spray system and the water bath 27, a water spray system may be used for quenching the treated bodies, the water sprays of such a system being directed towards the screen 28.

The discharge hopper 20 may be constructed in the same manner as the sand heater 5 with cascade plates but without any means for firing a fuel therein. In this case the chamber which corresponds to the combustion chamber 9 would have an opening which is controllable in size to permit a draft of air to flow up through the unheated sand and out through a chimney, to cool the sand in passage through the hopper 20. However, it will be appreciated that any other appropriate means for cooling the sand may be employed.

For a heat treatment operation the sand circulating systems for the heater 5 and hopper 20 are first charged with sand and set in operation, the heater 4 is fired, the heater heating the sand in passage therethrough to a temperature normally in the range of 400° to 600° C. The slide dampers 17 on the hoppers 16 are set to give the desired flow of air. The conveyor 1 is set in motion, the hopper 2 is charged with untreated bodies of combustible material, by means of a container or conveyor for example, and a bed of bodies of combustible material is established to a predetermined thickness on the conveyor. A bed of bodies is continuously established on the conveyor 1 by the hopper 2 the conveyor moving continuously throughout the heat treatment operation.

In the heat treatment zone beneath the sand spray nozzles 8, sand is sprayed evenly and continuously by the nozzles 8 onto the bed and, as the heated sand percolates through the interstices between the bodies on the bed, heat is transferred to the bodies. Air which has been heated by the sand rises up through the interstices between the bodies. By means of the dampers 17 controlled pyrolosis, i.e. distillation, oxidation, polymerization and mild carbonization of the fractions which give rise to a smoke emission value above the specified legal limit when the untreated bodies are burnt occurs.

By selective adjustment of the slide dampers 17 on the hoppers 16, the rate of flow of hot air upwards through the bed of bodies on the conveyor 1 may be controlled in any one or all of a series of zones, thereby controlling the rate of oxidation of the smoke emission fractions in the bodies. The gaseous products (fumes)

resulting from the heat treatment are continuously removed from the heat treatment zone by the extraction hood 15 for subsequent treatment and disposal, for example by burning in the sand heater 4. The heated sand flows continuously throughout the heat treatment under the action of gravity through the sand spray pipes 7 and nozzles 8, which spray multiple streams of sand evenly over the bed of bodies on the continuously moving conveyor through the bed and out of the bed through the openings 1d of the grid. Thus, the untreated bodies are defumed.

The sand, after having passed through the bed of bodies falls through the conveyor belt grid upper stage 1b into the hoppers 16, down the delivery chutes 19 and into the collecting hopper 12 which is intermittently opened by the skip 14, the collected used sand falling into the skip 14 and being recycled to the hopper 5 for reheating and reuse.

At the downstream end of the conveyor 1 the treated bodies are partially quenched by the unheated sand flowing under the influence of gravity throughout the heat treatment through the nozzle 22 which sprays this sand evenly over the portion of the bed below the nozzle 22. This sand passes through the bed and conveyor 1 into the hopper 24. The bodies are discharged from the conveyor onto the vibrating screen 28, which effectively removes from the bodies any stray sand which has adhered to them, this stray sand also passing into the hopper 24. The hopper 24 is intermittently opened by the skip 25 by means of which the sand in the hopper 24 is recycled to the supply hopper 23 for reuse.

The partially quenched bodies then fall off the screen 23 in the direction of the arrow onto the conveyor trough 26 for further quenching in the water bath 27 and transport to the finished product store.

The invention will now be further described with reference to the following example.

EXAMPLE

The bodies of combustible material consisted of ovoids which are formed by compressing a mixture of anthracite and pitch in a conventional roll press. The conveyor was in the form of a grid with overlapping side plates. The conveyor was moved at a rate of 10 feet an hour. A bed of ovoids was established on the moving conveyor, which bed was 21 inches wide, 21 inches deep and 10 feet long. Graded sand at a temperature of 430° C was sprayed through nozzles onto the moving bed of ovoids, the heated sand percolating through the bed at a rate of some 10 tons an hour. The sand, after passing through the bed and the conveyor was collected in hoppers beneath the grid conveyor while fume generated during the treatment was removed from the treatment zone by an extraction hood mounted over the conveyor. The treated ovoids were discharged from the conveyor, over a bar screen to separate stray sand, and were then quenched by water spray during transport by conveyor trough to a finished product store. One half a tone of finished defumed ovoids were obtained per hour giving a yield of 95 percent by weight. When a typical sample of treated ovoids and a typical sample of untreated ovoids were analyzed the following comparative results were obtained.

|  | Untreated Ovoids | Heat Treated Ovoids |
|---|---|---|
| Pitch content | 6.2% | 0% |
| Moisture content | 1.6 | 1.9 |
| Ash content | 4.2 | 4.0 |
| Volatile matter content | 10.7 | 8.0 |
| Gravimetric Smoke Emission Value | 20.0 | 1.4 g/hr |

It will be appreciated that the gravimetric smoke emission value for the treated ovoids is well within the aforementioned legal limit.

The apparatus described is particularly useful in heat treating or defuming pitch bound briquettes and ovoids, by virtue of there being no movement of the individual briquettes or ovoids relative to one another and to the conveyor belt or side plates during heat treatment when the binder in the ovoids or briquettes is in a plastic state. The ovoids or briquettes are particularly fragile at this time, but are not subjected to physical stress or abrasion likely to cause deformation or breakage, thereby substantially eliminating wastage.

The apparatus described is suitable for erection adjacent to a plant for manufacturing bodies such as pitch bound ovoids. In this case, the bodies can be conveyed straight from manufacture to the hopper 2 of this apparatus.

Furthermore, it will be appreciated that the apparatus described ma be used in other situations in which heat transfer is desired such as, for example, in the heat treatment of foundry cores.

I claim:

1. A method of heat treating bodies of combustible material including fractions having a gravimetric smoke emission value of more than 5 grams per hour when tested in accordance with B.S.3841, 1965, said method comprising the steps of:
   a. effecting continuous movement of an endless conveyor for the bodies, the conveyor having side plates, along a path extending from a location where the conveyor is charged with the bodies to a location where treated bodies are discharged from the conveyor, the continuous movement of the conveyor along the path being always unidirectional from the charging location to the discharging location,
   b. continuously feeding the bodies onto the endless conveyor at said charging location so as to form a bed of the bodies to a predetermined thickness on the conveyor, the conveyor and its movement enabling continuous movement of the bed of bodies to take place without movement of the individual bodies relative to one another or to the conveyor,
   c. continuously directing heated granular material onto the upper surface of the continuously moving bed whereby said heated granular material continuously passes by gravity through the bed in interstices between the bodies so as to transfer heat to the individual bodies, the used granular material continuously passing out of the bed through the endless conveyor so that the used granular material is thereby continuously removed from the bed and,
   d. controlling air flow through the bed of bodies during said transfer of heat thereby to effect controlled distillation, oxidation, polymerization and mild carbonization of said fractions resulting in a reduction of said smoke emission value to or below said 5 grams per hour.

2. A method as set forth in claim 1, wherein unheated granular material is directed onto the upper surface of the continuously moving bed at a location downstream of where the heated granular material is directed onto said upper surface, the unheated granular material passing by gravity through the bed in interstices between the bodies so as to cool the individual bodies before discharging thereof at said discharging location.

3. A method as set forth in claim 2, wherein the unheated granular material is collected after it has passed through the bed and the conveyor and is then recycled through a cooler where it is cooled and is thereafter reused.

4. An apparatus for heat treating bodies of combustible material, said apparatus comprising:
 a. an endless conveyor defining a plurality of openings, on which conveyor a bed of the bodies may be established,
 b. means for continuously moving the conveyor along a path extending from a location where the conveyor is charged with the bodies to a location where treated bodies are discharged from the conveyor, the continuous movement of the conveyor along said path being always unidirectional from the charging location to the discharging location,
 c. means for continuously feeding the bodies onto the endless conveyor so as to establish a bed of bodies to a predetermined thickness thereon, the conveyor and its movement resulting in continuous movement of the bed without movement of the individual bodies relative to each other or to the conveyor,
 d. means for continuously directing heated granular material onto the upper surface of the conveyed bed whereby said heated granular material continuously passes by gravity through the bed in interstices between the individual bodies so as to transfer heat to the individual bodies, the openings in the conveyor permitting used granular material to continuously pass therethrough, and thereby be continuously removed from the bed, and
 e. means for controlling air flow through the bed of bodies on the conveyor during said transfer of heat.

5. An apparatus as set forth in claim 4, wherein the endless conveyor is in the form of a belt which defines said openings and which is arranged with two spaced apart stages and wherein said air flow control means includes at least one collecting hopper disposed between the two stages and adjustable means for controlling inflow of air to said at least one hopper.

6. An apparatus as set forth in claim 5, wherein the adjustable means consists of a slide damper which is mounted in a wall of said at least one hopper.

7. An apparatus as set forth in claim 4 and further including means for directing unheated granular material onto the upper surface of the bed on the conveyor, which means is directed towards the conveyor and is located downstream of the means for directing heated granular material, and a cooler for cooling this granular material after it has passed through the bed.

8. An apparatus as set forth in claim 7, wherein the means for directing unheated granular material comprises a spray nozzle which is connected to said cooler through pipe means and an intermediate supply hopper for the unheated granular material.

* * * * *